United States Patent [19]

Zoghby et al.

[11] Patent Number: 4,817,673

[45] Date of Patent: Apr. 4, 1989

[54] FUSE TUBE WITH REINFORCING ELEMENT

[75] Inventors: David R. Zoghby, Allentown; Leon F. Hines, Hazleton, both of Pa.; Thomas D. Sampson, Rootstown, Ohio

[73] Assignee: Atlas Powder Company, Dallas, Tex.

[21] Appl. No.: 99,648

[22] Filed: Sep. 23, 1987

Related U.S. Application Data

[63] Continuation of Ser. No. 861,057, May 8, 1986, abandoned.

[51] Int. Cl.$^4$ ............................................. F16L 11/08
[52] U.S. Cl. ..................................... 138/174; 138/172; 102/275.1
[58] Field of Search ................................ 138/174, 118; 102/202.3, 275.1, 275.8, 275.9, 331; 425/376 R, 377, 378 R, 381.2, 461

[56] References Cited

U.S. PATENT DOCUMENTS

| | | | |
|---|---|---|---|
| 3,086,557 | 4/1963 | Peterson | 138/118 X |
| 3,590,739 | 7/1971 | Per-Anders Persson | 102/275.5 |
| 3,910,808 | 10/1975 | Steward | 156/429 |
| 3,963,856 | 6/1976 | Carlson et al. | 174/47 |
| 3,966,525 | 6/1976 | Steward | 156/195 |
| 4,140,154 | 2/1979 | Kanao | 138/174 X |
| 4,290,366 | 9/1981 | Janoski | 102/202.3 |
| 4,328,753 | 5/1982 | Kristensen et al. | 102/275.5 |
| 4,337,800 | 7/1982 | Carlson et al. | 138/122 |
| 4,375,381 | 3/1983 | Carlson et al. | 156/195 |
| 4,493,261 | 1/1985 | Simon et al. | 102/331 |

FOREIGN PATENT DOCUMENTS

| | | |
|---|---|---|
| 625672 | 7/1949 | United Kingdom . |
| 1083515 | 9/1967 | United Kingdom . |
| 1094691 | 12/1967 | United Kingdom . |
| 1301305 | 12/1972 | United Kingdom . |

OTHER PUBLICATIONS

Drawing entitled "Matriz tubo Reforzado Longitudinal Entrelazados" (date unknown).
Drawing entitled "Norabel Shock Tube System."

Primary Examiner—Henry J. Recla
Assistant Examiner—Glenn T. Barrett
Attorney, Agent, or Firm—Richards, Harris, Medlock & Andrews

[57] ABSTRACT

A reinforced tube suitable for use in the construction of an explosive signal transmission device. The tube is constructed from a low yield strength plastic material into which has been deposited one or more reinforcing yarns of a high tenacity and low elongation material in a position substantially parallel to the axis of the tube during the extrusion process.

16 Claims, 1 Drawing Sheet

FUSE TUBE WITH REINFORCING ELEMENT

This application is a continuation of application Ser. No. 861,057, filed May 8, 1986, abandoned.

TECHNICAL FIELD

The present invention relates to an explosive signal fuse tube containing a reinforcing yarn and in particular a tube made from a low yield strength plastic containing one or more reinforcing yarns of a high tenacity and low elongation material to prevent longitudinal deformation of the tube, said yarns being extruded within the wall of the tube simultaneously with the extrusion of the wall.

BACKGROUND ART

In the field of explosives, high strength detonating cord and low strength detonating cord are being rapidly replaced by energy transmission devices which have little or no brisance. These signal devices have the advantage of increased safety and lower noise levels making them particularly desirable for blasting operations close to populated areas. Such a signal transmission tube is disclosed in U.S. Pat. No. 4,290,366. Another fuse device is disclosed in U.S. Pat. No. 3,590,739.

A disadvantage of the tube utilized in construction of the signal transmission device such as that shown in U.S. Pat. No. 4,290,366 is that the signal tube which loosely contains the reactive element may be deformed longitudinally a substantial length. In contrast, the reactive element inside the fuse tube has little elasticity. As a result, in a borehole, and particularly a borehole filled with warm explosives, the tube may stretch a considerable length; whereas, the reactive element contained in the fuse tube does not stretch much. As a result the blasting cap provided at the end of the tube may move away from the end of the reactive element contained within the tube. This can create a gap between the end of the reactive element and the receptacle end of the blasting cap. As a result of this separation the reliability of the fuse and cap assembly may decrease and it may fail to initiate the cap. Any reduction in reliability of the assembly is undesired.

U.S. Pat. No. 4,493,261 addresses the problem of the stretching and breaking of fuse tubes such as used in a construction of a device disclosed in U.S. Pat. No. 3,590,739 by the incorporation therein of a plurality of textile filaments positioned between an inner tube over which is laid the textile filaments followed by the extrusion of a second outside tube over the inside tube and filaments. This construction has the disadvantage of being complex to form by requiring several extrusion steps and also having difficulties in achieving good quality bonds between the inner tube, the outer tube, and the filaments bonded therebetween. Further such a process usually has slow rates of productions because two or more extrusion steps are needed.

In contrast, the present invention provides an apparatus and method for the selective placement of one or more reinforcing yarns in an extruded signal tube in one step. This is advantageous in terms of both economics and also in achieving a good bond between the reinforcing yarn(s) and the tube wall. Also, it is advantageous because it allows a minimal wall thickness to be used while preventing blow outs of the tube wall from the reaction of the reactive filament by the selective placement of the yarns in the tube wall. The single step process of the invention can be performed while maintaining high production rates.

SUMMARY OF THE INVENTION

The present invention provides for a signal tube constructed of a wall made of plastic material of low yield strength and containing therein one or more low elongation, high tenacity reinforcement yarns which resist longitudinal deformation of the resulting signal tube. The reinforcing element or elements are placed in the tube in a single extrusion step. In the preferred embodiment, the reinforcing elements are located in a position substantially parallel to the axis of the tube. Preferably, the element or elements are placed at a location from the inside wall of the tube which is 0.2 or less of the wall thickness.

In another aspect, the present invention provides for an extrusion tip suitable for placing the reinforcement yarn or yarns within the tube wall as it is extruded. The tip comprises a wall defining a general cylindrical shape with a first end which converges to the axis of the tip. The first end of the tip forms one wall of a passageway for the passage of extrudate when the tip is placed in a frame adjacent to a die. A passageway is provided at the center of the first end of the tip for the passage of the reactive element to be placed in the tube. The converging walls of the first end form one side of a passageway through which extrudate passes and contains one or more yarn placement passageways which provide a means for the placement of the reinforcement yarn or yarns at preselected positions within the wall of the fuse tube. In the preferred embodiment, the yarn passageway(s) are comprised of members having channels therethrough which can be selectively positioned and an adjustment means is provided for the adjustment and locking in place of the yarn placement members. This permits variation of the position of the reinforcing yarn in the extruded tube wall.

BRIEF DESCRIPTION OF THE DRAWINGS

A more complete understanding of the invention may be had by reference to the following detailed description when taken in conjunction with the accompanying drawings, wherein.

DETAILED DESCRIPTION

Figure 1:
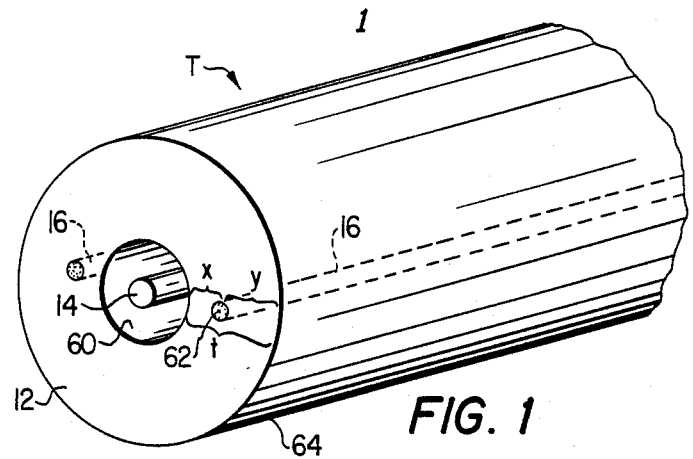
FIG. 1 illustrates a cross-sectional isometric view of a reinforced fuse tube.

The fuse tube of the present invention can be of any desired shape. However, a generally circular cross section is preferred. The reactive element of the fuse may be of any reactive material known in the art, such as described in U.S. Pat. No. 4,290,366 which is hereby incorporated by reference. FIG. 1 shows the cross section and isometric view of the fuse tube. The transmission tube 10 contains a reactive element 14. As described above, the reactive element may be any of those known in the art. The wall 12 of elongated tube 10 is also preferably formed of a relatively flexible polymeric material. As used herein, the term "flexible" refers to the ability of elongated tube 10 to bend longitudinally. Examples of acceptable materials include polyethylene, polypropylene, polypropylene copolymer polyvinylchloride, polybutylene, ionomers, nylons, Surlyn (a trademark of DuPont for its ionomer) and mixtures of these. Preferably the plastic is one which will remain flexible over the normal use temperatures encountered by the fuse which are normally from about −40° F. to about 150° F. Further, the plastic preferably is one which flows and may be extruded at less than the temperature at which the reactive element 14 decomposes or reacts.

The outer diameter of elongated tube 10 is preferably about 0.12 inch to 0.15 inch and the internal diameter is preferably about 0.05 inch. The practical range of the outer diameter is from about 0.06 inch to about 0.30 inch and the practical range of the internal diameter is from about 0.02 inch to about 0.15 inch. The tube may be of larger dimensions if desired.

In selecting an outer diameter, internal diameter and material of construction for elongated tube 10, it is desirable to consider the energy that the reactive element 14 will release during reaction so that elongated tube 10 has walls of sufficient strength to avoid rupturing. In this manner, accidental initiation of other explosive devices located proximately to the energy transmission device can be substantially eliminated. Also, destruction or injury to the surroundings will also be similarly eliminated.

Contained within the tube wall 12 are reinforcement yarns 16. (One of the reinforcing yarns is shown in phantom). Two reinforcement yarns 16 are shown in FIG. 1; however, one yarn may be used or more than two yarns may be utilized. Two yarns are preferred. When more than one yarn is used it is preferred they are spaced equidistant around the tube. The yarn(s) are deposited in the tube wall during the extrusion of the tube wall in a single step.

The reinforcement yarns 16 are made from any yarn material of high tenacity with low elongation properties. Preferably a nonconductive material is used. Most preferred are yarns made from textile fibers having tensile strengths in the range of 200,000 to about 750,000 p.s.i. and elongations at failure (where the yarn breaks) of 1.5–4%. Examples of such preferred materials would be yarns of fiberglass, aramids (sold by DuPont under the trademark Kevlar) and carbon. A yarn made from these preferred materials and used as a reinforcement yarn 16 would have a diameter of 0.008 to 0.030 inches, a breaking strength under a load of 10 pounds to 75 pounds, and elongation at failure of 2–5%. Less preferred, but useful in come cases, are yarns made from textile fibers having tensile strengths in the range of 90,000 to less than about 200,000 psi and elongations at failure of about 5–15%. Examples of these materials would include polyesters, nylons, and rayons. The reinforcement yarns may be of the monofilament, multifilament, or spun type. The reinforcing yarn can be made from a combination of suitable materials. The yarn material must also not degrade at the temperatures used for extrusion of the tube wall 12, which are generally from about 350° F. to 450° F. The reactive elements 14 used in the art usually decompose or react at about 600° F. Therefore, the above range for extrusion provides a safety margin for the extrusion of the tube wall. The reinforcing yarns maintain their useful tensile properties over the intended use temperature range of −40° F. to 150° F. The reinforcing yarns preferably remain flexible over the intended use temperature range of −40° F. to 150° F.

An elongated plastic tube such as tube 10 but without the reinforcing yarns having an outside diameter of 0.150 inch and an internal diameter of 0.050 inch and made of LLDPE (linear low density polyethylene) generally has a yield point of about 20% elongation under a force of about 10 pounds and typically fails at elongation of several hundred percent The yield point is the lowest stress at which a material undergoes plastic deformation, below this stress the material is elastic, and above it is plastic. In comparison an elongated tube 10 of the same material and dimensions in combination with reinforcing yarns 16 would typically fail at an elongation of 2-3% at a tensile force of 30 lbs. or greater depending on the number, size, and type of reinforcing yarns 16. Advantageously, the reinforcing yarns, when overstressed, will break and the sudden force imparted on the tube wall in the area of the broken yarn(s) will rapidly neck and make it obvious to the user that the signal tube should no longer be used. The user may then simply cut out the damaged portion of the tube and utilize the remaining portions, or take other appropriate action.

The reinforcing element(s) can be made from any flexible, high tenacity, low elongation material Preferably a nonconductive material is used. Suitable materials include fiberglass and rayon.

The fuse tube is manufactured by known extrusion techniques together with the implementation of the extrusion tip provided by the present invention. Plastic material to form the tube wall is heated to the desired temperature so that it will flow and be extrudable. From the melt chamber the plastic is forced into an extrusion device. Suitable devices are known in the art and generally constitute a frame which holds the tip and a die. The frame, extrusion tip and die are positioned to form a passageway through which the extrudate is forced between the tip and the die to form the desired shape of the tube. The formed tube exits from the die and then is subsequently quenched with water to assure the extrudate has set.

The present invention is highly desirable in that the reinforcement yarn can be placed within the tube in a single extrusion step. This is accomplished by providing member(s) that form yarn passageways through the extrusion tip.

Figure 2:
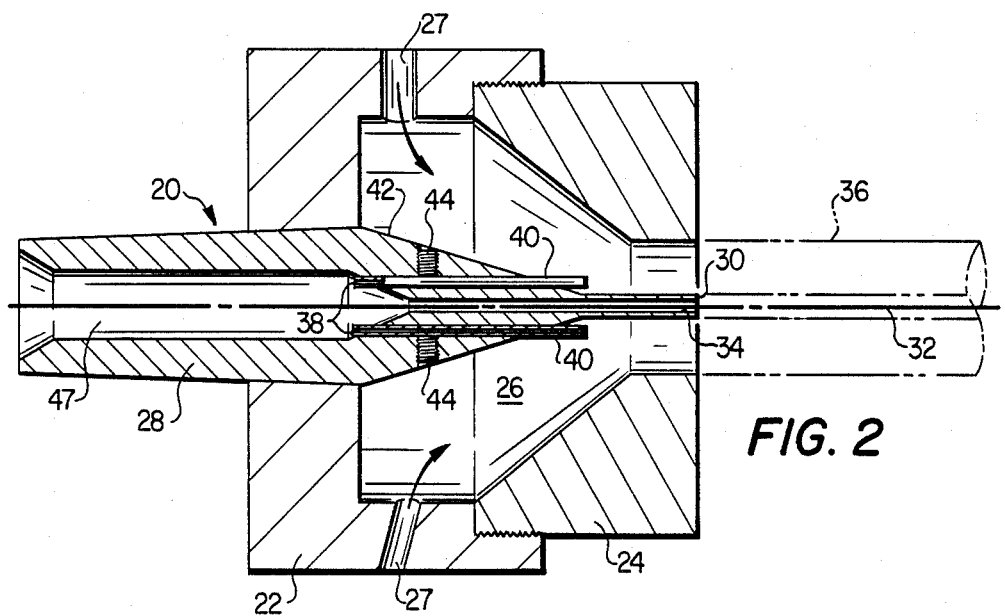
FIG. 2 illustrates a cross-sectional view of the extrusion tip of the present invention mounted on a frame with the die.

FIG. 2 shows a cross-sectional view of the extrusion tip 20 of the present invention mounted on a frame 22 in conjunction with a die 24 to form a passageway 26 for the passage of extrudate. Extrudate enters the passageway 26 from the melting means through openings 27 as shown by the arrows. The tip 20 has a generally cylindrical wall 28, which at the first end 30 tapers to a point coincident with the axis 32 of the tip 20 where a reactive element passageway 34 is provided through which the reactive element of the fuse is fed into the formed tube (tube 36 shown in phantom, reactive element and reinforcing yarns not shown). The tip 20 as shown also has two reinforcement yarn channels 38 formed by members 40 inserted into holes in the tip 20. Member 40 forms a channel or passageway from the inside of the tip 20 through the tip wall 28 and exits the tip on surface 42 which forms one side of extrudate passageway 26. The members 40 are held in place by any suitable means such as set screws 44. The channel members 40 pass through the wall of the tip to connect the inside of the tip 47 with or beyond the surface 42 of the tip which forms one side of the extrudate passageway 26. The yarn passageways or channels may be formed merely by drilling holes in the tip 20. The size of the channel 38 in member 40 is of sufficient diameter to allow passage of the yarn diameter selected while small enough to prevent back flow of extrudate into the inside of the tip 47. The tip may be constructed of any conventional material such as steel or stainless steel.

The yarn channels 38 shown in FIG. 2 are illustrated as being provided by hollow tubes that can be positioned adjustably. When the set screw 44 is loosened, the position of member 40 can be adjusted. This allows the position of the yarns to be varied within the wall of the signal tube. By extending the end of member 40 within passageway 26 further away from surface 42 of the tip, the reinforcing yarn is positioned closer to the outer surface of the formed tube. By moving this end of member 40 closer to surface 42, the yarns are positioned closer to the interior surface of the tube wall. Other means for the adjustment of member 40 may be provided. The tip of the present invention may be utilized to place the reinforcing yarn or yarns at any preselected position in the tube wall. The advantages to an adjustable reinforcement yarn channel provided by member 40 is that it permits easy variation in the positioning of the reinforcement yarn. The members 40 may be varied independently of each other.

Referring to FIG. 1, which shows a cross-sectional area of the tube 10, the nominal wall thickness of the tube is represented by a small t. The distance from the interior wall 60 of the tube 10 radially outward to the midpoint 62 of the yarn 16 is identified as x. The distance from the midpoint 62 of reinforcement yarn 16 to the outer edge 64 of the wall 12 is identified as y.

In a preferred embodiment, x is 20% or less of t, the tube wall thickness. This has two advantages. First, it places the reinforcement yarn close to the interior passageway of the tube minimizing deformation of the outside tube wall and maintaining it relatively circular. Maintaining a generally circular outside cross section allows for enhanced ability to form a watertight seal when a blasting cap is attached to one end of the tube. A second advantage is that this allows maintenance of a relatively thick segment of wall represented by y which is coherent. This is important to prevent the tube wall 12 from rupturing during reaction of the reactive element 14, while maintaining a minimal thickness of the tube wall 12.

Figure 3:
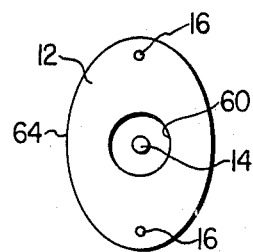
FIG. 3 illustrates a cross-sectional area of one embodiment of the present invention where the reinforcing yarns are positioned close to the outer wall of the tube.

Rupturing of the tube can also be reduced by placing the reinforcement yarns near the outer surface of the tube such that y is 20% or less of t, the wall thickness. However, this is not preferred as it tends to distort the circular cross section of the outer surface 64 of the tube into an elliptical shape of the outside of the tube such as shown in FIG. 3. Such an elliptical shape is less desired because it is more difficult to achieve a reliable waterproof seal when a blasting cap is attached to the end of the tube.

Figure 4:
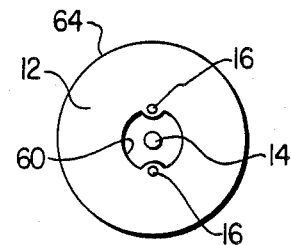
FIG. 4 illustrates a cross-sectional area of one embodiment of the present invention where the reinforcing yarn is positioned close to the inner wall surface of the tube.

The placement of the yarns 16 closer to interior surface wall 60 of the tube can deform the circular cross section of the interior as shown in FIG. 4 without detrimental effects on the functioning of the fuse, while maintaining the circular cross section of the outer surface 64 of the tube to achieve a good seal with a blasting cap. For example, the nominal outside diameter of fuse with the reinforcing yarns close to the outer surface may be 0.150 inch with variations in diameter from 0.140 to 0.160 inch; whereas, a tube with the reinforcing yarns close to the interior wall can have a nominal O.D. of 0.150 inch with variations from 0.148 to 0.152 inch.

Generally, the reinforcing yarn diameter can be between 0.008 inch and 0.30 inch for tubes with wall thickness. The size of the reinforcing yarn can be varied depending upon the wall thickness of the tube, the positioning of the yarn, and the amount of variation in the outer tube diameter that can be tolerated. For good bonding between the plastic of the wall and the reinforcing yarn, the wall thickness should be 0.01 inch greater than the diameter of the reinforcing yarn. For rupture resistance, the wall thickness should be two to three times the reinforcing yarn diameter. For a very thick wall the placement of the reinforcing yarn is less critical. As the tube wall thickness increases for the same strength of reactive element 14 the placement of the reinforcement yarn be varied more widely and still maintain tube integrity. For example, a tube wall with a thickness of 0.15 inch in many instances ruptured upon initiation of the reactive element 14 when the reinforcement yarn was placed midway in the wall thickness. In contrast, when the reinforcement yarn was positioned close to the inner wall where x was 0.2 t or less the tube did not rupture, when the same strength reactive element was used.

The reinforcement yarn is preferably placed substantially parallel to the longitudinal axis of the tube. Although a slight helical pattern is possible it is less desired because it would permit further elongation of the tube prior to failure of reinforcing yarn than when the element is placed substantially parallel to the axis of the tube.

It is important to achieve a good bond between the reinforcement yarn and the tube wall. This prevents the tube wall from sliding over the reinforcement yarn(s) and thus elongating an undesirable distance. A good bond is generally assured by using a coupling agent. The coupling agent is any of those suitable and known in the art for achieving a good bond between the tube material and the material from which the reinforcing yarn is made.

The coupling agent may be applied in two manners. One manner is to coat the reinforcing yarn with the coupling agent prior to its extrusion within the material making the tube wall. For example, when the tube wall is constructed from polyethylene (LLDPE for example) and the reinforcing yarn is fiberglass, the coupling agent is a Polyester Resin Compatible Finish applied, by Owens Corning Fiberglass, to the fiberglass yarn which is then extruded within the tube wall. Another method is to admix the coupling agent with the plastic utilized to make the tube wall and then extrude the mixture to form the tube wall. For example, when the tube wall is constructed from polyethylene and the reinforcing yarn is fiberglass, the coupling agent, titante sold under the trade name CAPS L44/E by KENRICH Petrochemicals, Inc., is added to the polyethylene when it is melted and then the tube is extruded with the fiberglass within the wall.

The reinforcing yarn may be a single strand of material, such as a monofilament, or it may be made from a group of twisted filaments which forms a multifilament or spun yarn. Yarns made from twisted strands provide a rougher surface which can improve the coupling of the yarn to the tube wall material by the greater surface area. The following examples demonstrate the present invention.

EXAMPLE 1

A tube wall was made by heating polyethylene to a temperature of about 360° F. and extruding it without any reinforcement yarn to form a tube with a nominal outside diameter of 0.150 inch and a nominal interior diameter of 0.050 inch giving a nominal wall thickness of 0.05 inch. This tube was then subjected to a longitudinal stress of 20 pounds. The tube demonstrated a yield point at about 15% elongation under this stress and failed at greater than 600% elongation.

EXAMPLE 2

A tube was constructed in accordance with the present invention by extruding the same material utilized in Example 1 but by incorporating two reinforcing yarns in the tube wall where t, the wall thickness, was 0.50 inch and x was =t 0.01 inch. This tube showed 1% elongation under the 20 pounds stress. The tube failed at a stress of 38 pounds and an elongation of 4%.

EXAMPLE 3

To demonstrate the significance of the placement of the fiber in the tube wall, tube walls were constructed of nominal thickness of 0.43 inch. Tubes were then constructed wherein the reinforcement yarn was at a position where x equaled 0.01, 0.02 and 0.03 inches. The tubes contained the same strength reactive element of the type identified in U.S. Pat. No. 4,290,366. The reactive element was nitrocellulose yarn and polyester yarn twisted to form a continuous reactive element about 0.01 inch in diameter. On initiation of the reactive element, the tubes where x was 0.01 inch did not blow out; and the tube where x was 0.03 inch exhibited infrequent blowouts whereas, tubes constructed where x=0.02 inch frequently exhibited one or more blow outs every several feet. These blow outs were in the form of slits.

The above description is intended to describe the preferred embodiment and obvious variations would be apparent to those skilled in the art.

What is claimed is:

1. A reinforced fuse tube which resists longitudinal deformation comprising:
(a) a wall comprised of a low yield strength plastic defining a passageway therethrough in which a reactive element may be placed, said tube having a diameter of about 0.3 inches or less; and
(b) one or more reinforcement yarns of a high tenacity non-conductive material exhibiting less than 15% elongation at failure deposited within said wall, said reinforcement yarns being positioned substantially parallel to the longitudinal axis of said fuse tube, wherein the distance from the interior surface of said wall to the axis of the reinforcement yarn is equal to or less than 0.20 of the nominal thickness of the tube wall, said reinforced yarns fail when said fuse tube is elongated about 4% such failure causing a visible depression on the tube in the area of failure allowing the user to identify a defective tube.

2. The reinforced fuse tube of claim 1 wherein said low yield strength plastic is selected from the group consisting of polyethylene, polyvinylchloride, polybutene, nylons, polypropylene, and mixtures thereof.

3. The reinforced fuse tube of claim 2 wherein said reinforcement yarn has a tensile strength in the range of about 90,000 to about 750,000 pounds per square inch.

4. The reinforced fuse tube of claim 3 wherein said reinforcement yarn is selected from the group consisting of fiberglass, aramids, carbon, polyester, rayon, nylon, and combinations thereof.

5. The reinforced tube of claim 1 wherein said reinforcement yarn is selected from the group consisting of fiberglass, aramids, and combinations thereof.

6. The reinforced fuse tube of claim 1 wherein said reinforcement yarn has a tensile strength in the range of from 90,000 to about 750,000 pounds per square inch.

7. The reinforced fuse tube of claim 6 wherein said reinforcement yarn is selected from the group consisting of fiberglass, aramids, carbon, polyester, rayon, nylon, and combinations thereof.

8. A reinforced energy transmission tube which resists longitudinal deformation comprising:
(a) a wall made of a low yield strength plastic material defining a passageway therethrough, said tube having an outside diameter of about 0.3 inches or less;
(b) a reactive filament of a self-oxidizing material loosely contained within the passageway; and
(c) one or more reinforcement yarns of high tenacity, non-conductive and low elongation material, the Yarns having tensile strength in the range from about 90,000 to about 750,000 pounds per square inch and exhibiting failure at less than 15% elongation, said reinforcement yarns are deposited within said wall of said tube in a position substantially parallel to the longitudinal axis of said tube, said yarn exhibiting failure at about 4% elongation of said reinforced tube such failure thereby causing a visible depressions in the tube in the area of failure allowing the user to identify a defective tube.

9. The reinforced energy transmission tube of claim 8 wherein said low yield strength plastic is selected from the group consisting of polyethylene, polyvinylchloride, polybutene, nylons, polypropylene, and mixtures thereof.

10. The reinforced energy transmission tube of claim 8 wherein said reinforcement yarn has a tensile strength in the range of about 200,000 to about 750,000 pounds per square inch.

11. The reinforced tube of claim 8 wherein said reinforcement yarn is selected from the group consisting of fiberglass, aramids, carbon, polyester, rayon, nylon and combinations thereof.

12. The reinforced energy transmission tube of claim 11 wherein said reinforcement yarn has a tensile strength in the range of about 200,000 to about 750,000 pounds per square inch.

13. The tube of claim 8 wherein the distance from the interior surface of said wall to the axis of the reinforcement yarn is equal to or less than 0.20 of the nominal thickness of the tube wall.

14. The reinforced tube of claim 13 wherein said reinforcement yarn is selected from the group consisting of fiberglass, aramids, carbon, polyester, rayon, nylon and combinations thereof.

15. The reinforced tube of claim 13 wherein said reinforcement yarn has a tensile strength in the range of about 200,000 to about 750,000 pounds per square inch.

16. The reinforced tube of claim 15 wherein said reinforcement yarn is selected from the group consisting of fiberglass, aramids, carbon, and combinations thereof.

* * * * *